UNITED STATES PATENT OFFICE.

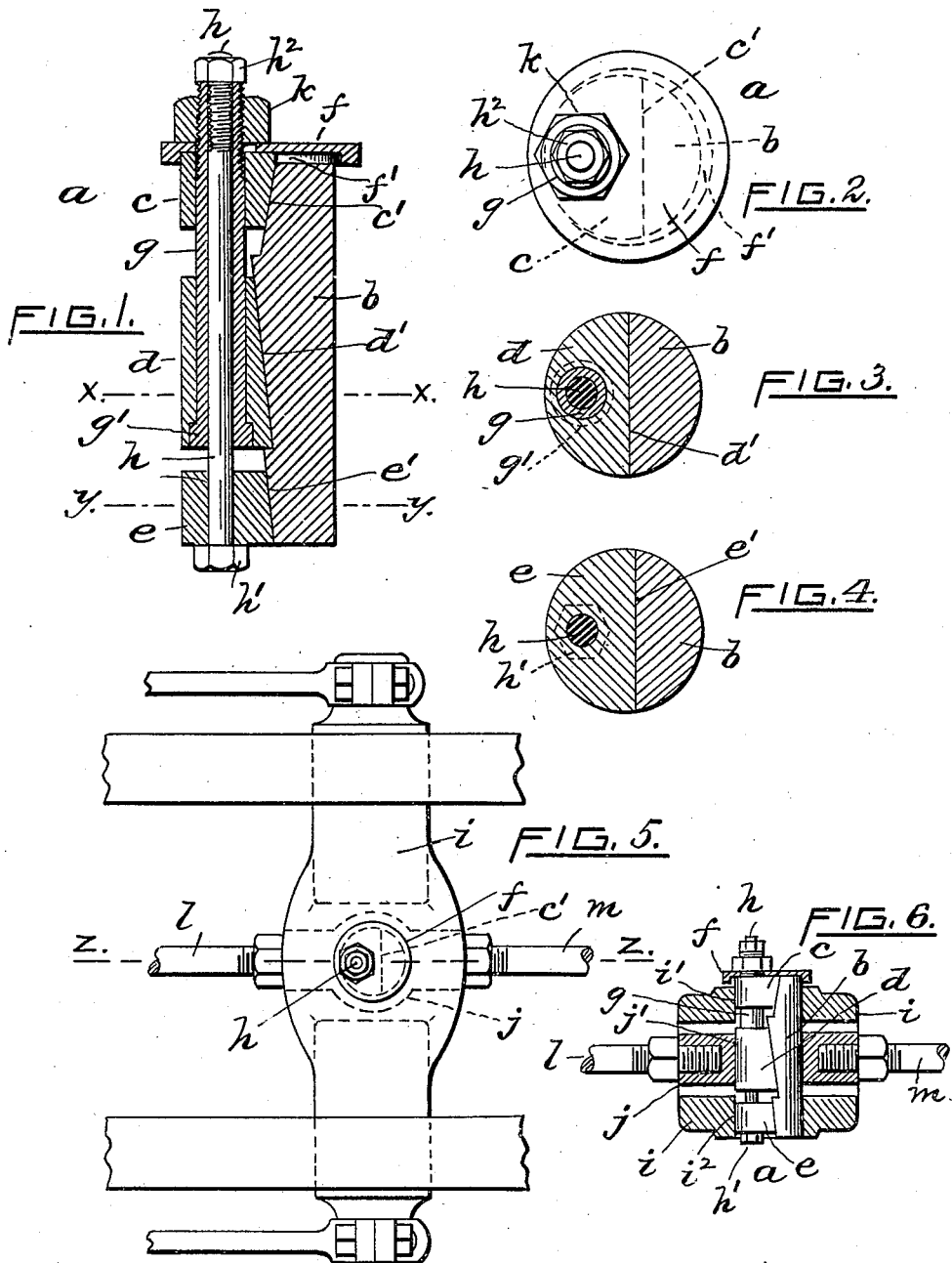

FRANK RICH, OF PROVIDENCE, RHODE ISLAND.

EXPANSION-PIN.

No. 903,777.  Specification of Letters Patent.  Patented Nov. 10, 1908.

Application filed March 25, 1908. Serial No. 423,265.

*To all whom it may concern:*

Be it known that I, FRANK RICH, a citizen of the United States, and resident of the city of Providence, in the county of Providence, State of Rhode Island, have invented certain new and useful Improvements in Expansion-Pins, of which the following is a specification.

My invention relates to an improved structure of expansion-pin, essentially adapted for connecting the swivel-block to the crosshead of air-compressors; and the object in view is to provide means to obtain uniformity of expansion throughout the length of the pin, in order that the latter may fit tightly within the bores of the crosshead and its swivel-block.

In the accompanying sheet of drawings, Figure 1 represents a vertical section of an expansion-pin constructed in accordance with my invention. Fig. 2 is a top plan view of the pin. Fig. 3 is a transverse section on line $x$—$x$ of Fig. 1. Fig. 4 is a transverse section on line $y$—$y$ of Fig. 1. Fig. 5 is a top plan view of the crosshead of an air-compressor, showing my improved pin applied thereto, and, Fig. 6 is a transverse section on line $z$—$z$ of Fig. 5.

Like reference characters indicate like parts.

$a$ designates my improved expansion-pin, as a whole, comprising in its structure the stationary wedge $b$; the wedge-blocks $c$, $d$ and $e$; the washer $f$; the adjusting sleeve $g$, and the adjusting bolt $h$. The wedge $b$ and wedge-blocks $c$, $d$ and $e$ constitute the gripping members of my device, and the inclined faces of said members bear upon each other, and each member is externally rounded to fit the bores of the crosshead $i$ and its swivel-block $j$. The upper wedge $c$ and central wedge $d$ are loosely mounted on the adjusting sleeve $g$, and the latter has an enlarged integral head $g^1$ loosely entering a recess formed in the bottom of said wedge $d$, in the manner shown in Fig. 1.

The upper portion of the sleeve $g$ projects beyond the top wedge $c$ and is externally screw-threaded to loosely receive the washer $f$, and a nut $k$ is mounted on the threaded portion of said sleeve to impinge against said washer in holding both wedges $c$ and $d$ in a proper position upon the gripping member $b$. The washer $f$ is of greater diameter than the expansion-pin $a$, in order to provide a circular recess $f^1$ in its bottom face to freely receive the rounded portions of the gripping members $b$ and $c$, in the manner shown in Figs. 1, 2 and 6. The face of the upper wedge-block $c$ inclines outwardly from the axis of the sleeve $g$, as at $c^1$ in Fig. 1, while the face of the central wedge-block $d$ inclines inwardly of the axis of said sleeve, as at $d^1$ in said figure. The bottom wedge-block $e$ is loosely mounted on the adjusting bolt $h$, which passes loosely through the sleeve $g$, and said bolt has an enlarged integral head $h^1$ to prevent displacement of said wedge-block $e$, and the upper portion of this bolt is screw-threaded to receive a nut $h^2$ to impinge against the end of the sleeve $g$ in holding the wedge-block $e$ in a proper position upon the gripping member $b$. The face of this bottom wedge-block $e$ inclines inwardly of the axis of the sleeve $g$, as at $e^1$ in Fig. 1.

When the parts are in the position shown in Fig. 1 the axis of the adjusting members $g$ and $h$ is eccentric to the axis of the device, and as the latter is inserted within the bores of the crosshead $i$ and its swivel-block $j$ the inclined faces $c^1$, $d^1$ and $e^1$ are brought to extend at a right angle to the axis of the piston-rods $m$ and $l$ of the air-compressor, as at $c^1$ in Fig. 5.

To adjust the parts of my improved expansion-pin the nut $k$ is first turned to cause the upper wedge-block $c$ and central wedge-block $d$ to move toward each other and firmly impinge against the bores of the crosshead and its swivel-block, as at points $i^1$ and $j^1$ in Fig. 6, after which the nut $h^2$ is turned to cause the bottom wedge-block $e$ to move up and firmly impinge against the lower bore of the crosshead, as at a point $i^2$ in said figure.

Thus, by my construction and arrangement of parts I provide a device that contains in itself all that is necessary to readily obtain uniformity of expansion throughout the length of the pin.

What I claim and desire to secure by Letters-Patent is—

1. The combination in an expansion-pin, of a stationary member having three inclined bearing surfaces; a washer mounted upon one end of said member and provided with a circular recess to receive the latter; a sleeve having an exterior screw-threaded portion projecting through said washer; two wedge-blocks in contact upon two bearing surfaces of said stationary member; a nut upon the threaded portion of said sleeve to impinge against said washer and cause said blocks to move towards each other; a bolt passing loosely through said sleeve and provided with a screw-threaded portion; a wedge-block carried by said bolt and in contact upon the remaining bearing surface of said stationay member; and a nut upon the threaded portion of said bolt to impinge against said sleeve and cause said last mentioned block to move upon said stationary member.

2. In combination, the stationary member $b$ having inclined faces $c^1$, $d^1$ and $e^1$; the washer $f$ provided with a recess $f^1$ to receive the end of the said member; the threaded sleeve $g$ projecting loosely through said washer and having an enlarged head $g^1$; the wedge-blocks $c$, $d$ mounted on said sleeve; the nut $k$ on the threaded portion of said sleeve; the threaded bolt $h$ passing through said sleeve and having an enlarged head $h^1$; the wedge-block $e$ mounted on said bolt, and the nut $h^2$ on the threaded portion of said bolt, all arranged substantially as shown and for the purpose specified.

In testimony whereof I affix my signature in presence of two witnesses.

FRANK RICH.

Witnesses:
GEORGE W. BENNETT, Jr.,
C. T. HANNIGAN.